US006656856B1

(12) United States Patent
Rucker

(10) Patent No.: US 6,656,856 B1
(45) Date of Patent: Dec. 2, 2003

(54) MATTRESS AND FURNITURE INSULATOR PAD

(75) Inventor: John R. Rucker, Norwood, PA (US)

(73) Assignee: Foamex L.P., Linwood, PA (US)

( * ) Notice: Subject to any disclaimer, the term of this patent is extended or adjusted under 35 U.S.C. 154(b) by 484 days.

(21) Appl. No.: 09/157,705

(22) Filed: Sep. 21, 1998

Related U.S. Application Data

(63) Continuation-in-part of application No. 08/408,349, filed on Mar. 22, 1995, now abandoned.

(51) Int. Cl.[7] ................................................ B32B 3/26
(52) U.S. Cl. .................... 442/30; 442/32; 442/49; 442/50; 442/56; 428/316.6; 428/317.1; 428/319.1; 5/698; 5/701; 5/740; 297/463.2
(58) Field of Search .................. 428/316.6, 317.1, 428/319.9; 442/30, 32, 49, 50, 56; 5/698, 701, 740; 297/463.2

(56) References Cited

U.S. PATENT DOCUMENTS

| | | | |
|---|---|---|---|
| 2,957,793 A | 10/1960 | Dickey | 156/324 |
| 2,999,041 A | 9/1961 | Lappala | 428/316.6 |
| 3,172,072 A | 3/1965 | Willy | 264/46.3 |
| 3,315,283 A | 4/1967 | Larsen | 5/354 |
| 3,562,085 A | 2/1971 | Crandal et al. | 156/324 |
| 3,616,142 A | 10/1971 | Schrotenboer | 161/71 |
| 3,741,854 A | 6/1973 | DeGoria | 156/324 |
| 3,767,500 A | 10/1973 | Tally et al. | 156/184 |
| 3,775,236 A | 11/1973 | Ambrose | 428/319.9 |
| 3,916,460 A | 11/1975 | Harty | 5/13 |
| 3,923,293 A | 12/1975 | Wiegand | 267/94 |
| 4,076,886 A | 2/1978 | Corcoran | 428/294 |
| 4,129,672 A | 12/1978 | Momura et al. | 156/322 |
| 4,248,650 A | 2/1981 | Murro | 156/181 |
| 4,385,131 A | 5/1983 | Fracalossi et al. | 428/319.3 |
| 4,418,106 A | 11/1983 | Landler et al. | 428/89 |
| 4,758,299 A | 7/1988 | Burke | 156/313 |
| 4,768,253 A | 9/1988 | Boyd et al. | 5/464 |
| 5,211,792 A | 5/1993 | Carter | 156/306.6 |
| 5,429,852 A | 7/1995 | Quinn | 428/319.3 |

FOREIGN PATENT DOCUMENTS

CA 2170923 9/1996

*Primary Examiner*—Elizabeth M. Cole
(74) *Attorney, Agent, or Firm*—Patricia Smink Rogowski

(57) ABSTRACT

The present invention relates to mattress or furniture insulator pads that are placed between the coil springs and the cushioning material in mattresses or furniture, such as chair seats. Such insulator pads prevent the springs from piercing the furniture cushion and provide a bridge across the springs to more evenly distribute weight over the springs. The insulator pads according to the invention have three layers formed by sandwiching polyurethane foam between stiffening layers, preferably formed from polypropylene openmesh netting. Most preferably, a five layer insulator pad has the polyurethane foam sandwiched between stiffening layers and also has outer layers of polyurethane foam, applied adjacent to the stiffening layers, forming the top and bottom surfaces of the pad. Such outer layer foam sheets provide friction characteristics that retard relative movement between the cushion and the springs. The insulator pads have a stiffness modulus above 100 psi, preferably above 200 psi and most preferably above 300 psi.

4 Claims, 3 Drawing Sheets

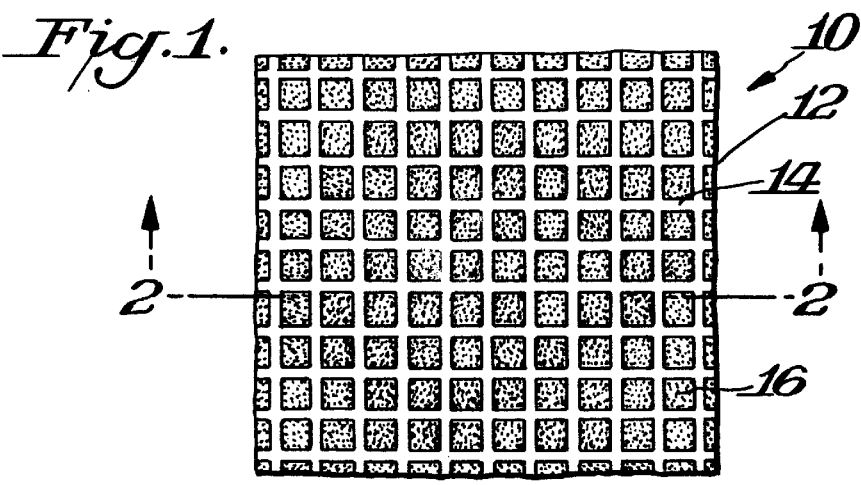
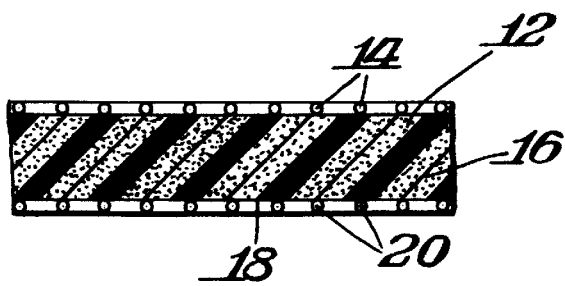
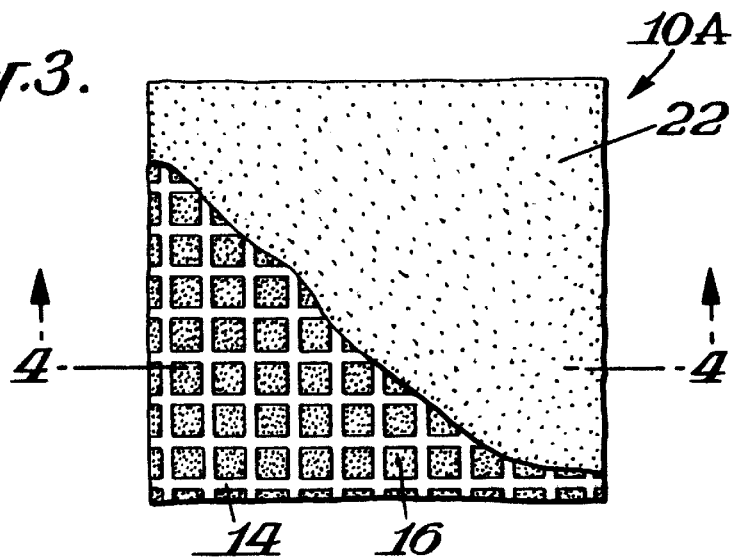
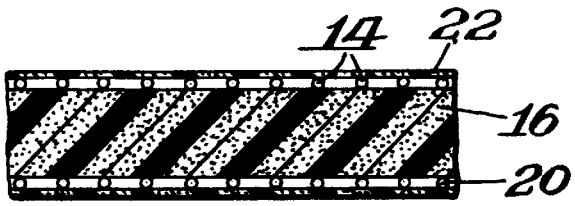

MATTRESS AND FURNITURE INSULATOR PAD

CROSS-REFERENCE TO RELATED APPLICATION

This application is a continuation-in-part of application Ser. No. 08/408,349, filed Mar. 22, 1995, now abandoned.

BACKGROUND OF THE INVENTION

The present invention relates to separating barriers or insulator pads used with mattresses and upholstered furniture with spring support, including cushions and chair seats installed in motor vehicles and airplanes, and methods for making such barriers or pads.

Spring support systems, such as coil springs provided in mattresses and chair seats, usually are separated from the cushioning material or top furniture or mattress surface. The separating barrier or insulator performs several functions. First, it protects the cushion from the sharp tips of the wire springs. Without a separating barrier or insulator, the edges of the wire springs could puncture the cushioning material, damaging the cushion and in time possibly protruding from the surface of the cushion to poke or scratch the individual who sits or reclines upon the cushion. Second, it forms a bridge between the individual springs so that the load on the cushion is more evenly distributed across the springs. Without a separating barrier or insulator, the coil springs would act upon the cushioning material individually, eventually making the surface of the cushion feel bumpy and uncomfortable to the individual who sits or reclines upon the cushion (sometimes called "telegraphing"). Third, it adds some cushioning, albeit to a lesser degree when compared to the furniture cushion that is placed on top of the insulator pad.

At present, separating barriers or insulator pads are placed between the tops of the springs and the cushions or mattress pad tops. Such barriers or pads are usually formed from an inexpensive fibrous pad material, such as "shoddy," a layered sheet material composed primarily of textile scraps that are needle-punched, or, in some cases, compressed together with resin or glue. Shoddy is manufactured by a number of companies, including Jamesville Products Company and Chris Craft Company. Resinated shoddies that have increased stiffness and resist bending are often selected for insulator pads.

Using shoddies or resinated shoddies for the barrier or insulator pads has significant disadvantages. Because shoddy is formed from textile scraps, the product characteristics vary from lot to lot. The weight and thickness of the sheet of shoddy may vary even within the same lot. Such product variations cause significant performance variations. Moreover, the resins used to form the shoddy will break down or deteriorate and lose stiffness overtime. After only a short time in use, the shoddy will begin to compress its thickness, reduce its stiffness and lose its insulating properties. If the insulating pad breaks down, the cushion will have an uncomfortable, lumpy feel because the load atop the cushion is not evenly distributed over the springs.

U.S. Pat. No. 3,923,293 issued Dec. 2, 1975 to Wiegand discloses a spring insulator for mattresses comprising a one-sixteenth to one inch thick sheet of extruded polyethylene plastic foam sheet. Wiegand selects polyethylene over polyurethane because polyethylene has the strength and structural rigidity required. According to Wiegand, the stiff polyethylene foam sheet alone may form the insulator. Optionally, the polyethylene foam sheet may be bound to the wire springs of the mattress structure, or alternatively to the padding material forming the mattress pad (which may be cotton batting, polyurethane foam, or the like). A cotton or plastic net may be attached to the polyethylene sheet to reinforce the sheet and prevent creeping (i.e., shifting movement) within the spring cushion assembly. In view of the inherent stiffness of the polyethylene sheet, the net need not impart stiffness to the sheet. The Wiegand spring insulator requires added sound-dampening because the polyethylene sheet used is stiff enough to act as a drum head when the sheet lifts off and recontacts the mattress springs.

An object of the present invention is to provide a barrier or insulator pad that has substantially uniform physical properties, with good isolation characteristics, load distribution capabilities and offers some degree of cushioning, without the drawbacks associated with the prior art.

BRIEF DESCRIPTION OF THE DRAWINGS

FIG. 1 is a top plan view of an insulator pad of the present invention;

FIG. 2 is a cross sectional view of the insulator pad taken along line 2—2 of FIG. 1;

FIG. 3 is a top plan view of an alternate embodiment of the insulator pad of the present invention that has additional thin outer layers of foam;

FIG. 4 is a cross sectional view taken along line 4—4 of FIG. 3 of the alternate embodiment of the insulator pad;

SUMMARY OF THE INVENTION

Figure 5:
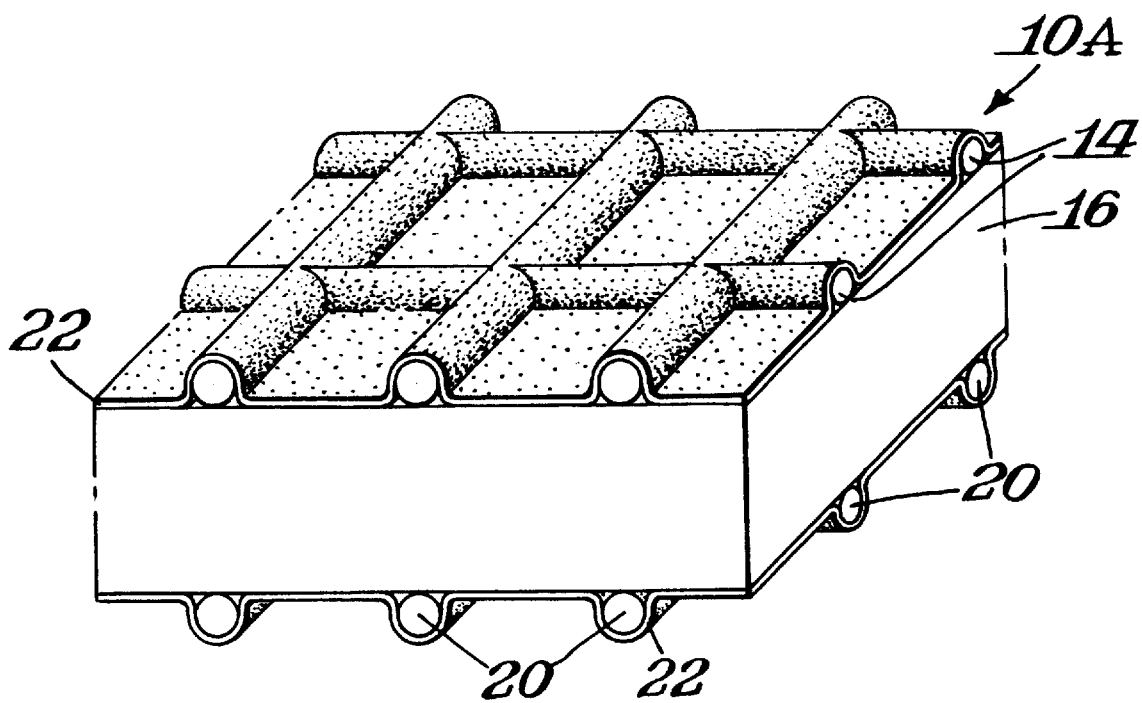
FIG. 5 is an enlarged perspective view showing a fragment of the alternate embodiment insulator pad of the present invention.

A mattress and furniture barrier or insulator pad according to the present invention has a core foam sheet, preferably polyurethane foam, most preferably polyether, polyurethane foam, sandwiched between first and second stiffening layers. The core foam sheet may also be formed of rebonded polyurethane foam.

Both the first and second stiffening layers are formed preferably of polypropylene. In a preferred embodiment of the invention, the stiffening layers comprise openmesh polypropylene netting. The combination of core foam sheet and stiffening layers must be sufficiently stiff to resist substantial bending and to prevent furniture springs from telegraphing through the insulator to the furniture cushion.

The stiffening layers may be attached to the foam sheet with a hot melt adhesive film, or a pressure sensitive adhesive, or by flame lamination. With all of these methods, a protective foam layer sheet separate from the foam sheet that forms the core of the insulator pad is placed between at least one roller surface and the stiffening layer sheet to prevent the roller from being contaminated with adhesive or depolymerized foam. To attach a stiffening layer using a hot melt adhesive film, the core foam sheet, a sheet of hot melt film adhesive, a stiffening layer sheet and a protective foam layer sheet are positioned adjacent one another in the stated order and passed between compression rollers. At least the roller in contact with the protective foam layer is heated and the heat from such roller softens and activates the hot melt adhesive.

To attach using a pressure sensitive adhesive, a layer of such adhesive is sprayed or otherwise applied to one surface of the core foam sheet, and the core foam sheet with the adhesive exposed, a stiffening layer sheet and a protective foam layer sheet are positioned adjacent one another in the stated order and passed between compression rollers. The compression forces applied to the sheets by the rollers cause the stiffening layer sheet to adhere to the core foam sheet.

To attach using flame lamination, a core foam sheet, a stiffening layer sheet and a protective foam layer sheet are again passed between compression rollers. However, before coming in contact with the rollers or the other sheets in the laminate product, one surface of the core foam sheet is exposed to heat or flame to soften or depolymerize the foam surface, creating a tacky or sticky surface. When thereafter compressed between the rollers, the stiffening layer adheres to the tacky core foam sheet surface. As the core foam sheet cools, the depolymerized surface repolymerizes and holds or bonds the stiffening layer in place.

The insulator pads so formed are placed between the coil springs and cushions of mattresses or furniture during manufacture, replacing the fiber pad or shoddy presently used. The stiffening layers in combination with the foam sheet core provide the bridging effect needed to prevent the furniture springs from "telegraphing" into the furniture cushion and provide desired additional cushioning. The materials for the core foam sheet and stiffening layers may be selected so that the insulator pad has consistent properties, such as stiffness (resistance to bending) and durability.

In a particularly preferred embodiment of the invention, the insulator pad comprises up to seven components resulting a final product of five layers: a foam top layer, a first stiffening layer, a core foam sheet center section, a second stiffening layer, and a foam bottom layer. The core foam sheet is sandwiched between the stiffening layers. They are fixedly attached to the foam sheet, preferably with hot melt film adhesive and heated compression rollers, so as to prevent relative movement between the foam sheet and the layers, provide dimensional stability to the core foam, and impart stiffness and rigidity against bending. The foam top and bottom layers are attached to the outer surfaces of the core foam center section also preferably by the hot melt film adhesive. The foam top and bottom layers are especially preferred when the stiffening layers are formed from openmesh netting, most preferably polypropylene or polyethylene netting. After the adhesive has been applied to the surfaces of the foam sheet or the hot melt film placed adjacent to the surfaces of the foam sheet, the layers are normally passed between compression rollers, preferably heated compression rollers.

The protective foam top and bottom layers prevent excess adhesive from contacting and building up on the compression rollers. Once the insulator pad is formed and inserted between furniture springs and furniture cushions, the foam layers which cover the stiffening layers provide increased friction to prevent the insulator pad from slipping or moving once installed.

A method of applying a stiffening layer to a core foam sheet includes the steps of applying adhesive to a surface of the core foam sheet, positioning one surface of a stiffening layer adjacent to the surface of the foam sheet that has the adhesive applied, placing a thin foam sheet adjacent to another surface of the stiffening layer, and passing the core foam sheet, stiffening layer and thin protective foam sheet between a pair of compression rollers so that the one surface of the stiffening layer adheres to the surface of the core foam sheet to which adhesive has been applied. If flame lamination is used rather than an adhesive, the surface of the core foam sheet is first softened or depolymerized before it is positioned adjacent to one surface of a the stiffening layer. Whether using adhesive or flame lamination, the layers are passed between compression rollers and the thin foam sheet provides a protective barrier between the compression roller and the stiffening layer that prevents adhesive from contacting or building up on the roller. Preferably, the stiffening layer has holes or gaps so that portions of the surface of the thin foam sheet will adhere to portions of the foam sheet surface to which adhesive was applied exposed through the gaps or holes in the stiffening layer. Most preferably, the stiffening layer will be formed of an openmesh netting material, such as a polypropylene or polyethylene netting, so that a greater amount of the core foam sheet surface with applied adhesive will be exposed through the gaps or holes in the mesh.

The particularly preferred method for applying the stiffening layer to the core foam sheet is to apply a hot melt film adhesive between the core foam sheet and the stiffening layer with a protective thin foam sheet adjacent to the stiffening layer forming a barrier between the stiffening layer and the surface of the compression roller when the sheets and layers to be laminated are passed between compression rollers. At least one of the compression rollers is heated. Most preferably, the hot melt adhesive film is applied to, or placed adjacent to, both the top and bottom surfaces of the foam sheet and stiffening layers are applied to both surfaces of the core sheet. In such a case, both of the compression rollers should be heated if the stiffening layers are to adhere to the foam sheet with only one pass through the compression rollers.

The stiffness modulus for the insulator pads of the present invention is at least 100 psi, and preferably is above 200 psi, most preferably above 300 psi. It is the combination of core foam sheet with first and second stiffening layers fixedly and immovably attached thereto that provides an insulator pad with sufficient stiffness and dimensional stability to resist bending and preclude furniture spring "telegraphing."

DESCRIPTION OF THE PREFERRED EMBODIMENTS

Referring to FIGS. 1 and 2, a portion of an insulator pad 10 according to the invention is shown. The insulator pad 10 has an identical top and bottom plan view. The top surface 12 comprises a stiffening layer 14 fixedly attached to a core foam center sheet 16. As shown in FIG. 2, the bottom surface 18 of the pad 10 similarly comprises a stiffening layer 20 fixedly attached to the core foam center sheet 16. The stiffening layers are so attached to prevent relative movement between the stiffening layers and the core foam sheet, and impart stiffness (i.e., dimensional stability and bending resistance) to the finished insulator pad.

The core foam center sheet 16 preferably is formed of polyurethane foam, most preferably polyether, polyurethane foam having a foam density of from about 0.6 to about 6.0 lbs/ft³. A rebonded polyurethane foam with a foam density in the range of about 3 to about 10 lbs/ft³ is also suitable. Rebonded polyurethane foam is a composite formed from scraps of polyurethane foam compressed together with a resin or adhesive. The core foam center sheet 16 should have a thickness in the range of from about ⅛ to about 1.0 inches, preferably from about ¼ to ½ inches. In a preferred embodiment of the present invention, the foam also has an $IFD_{25}$ of from about 10 to 200. The IFD of a foam is measured by the Indentation Force Deflection Test and the "$IFD_{25}$" numbers indicated above are "rest" values. That is, the force needed to compress the foam sample 25% of its initial thickness after being held in that position for one minute. The loading platen that is used in the test has a circular area of 50 in².

The stiffening layers 14, 20 may be any material with stiffness that will offer dimensional stability to the insulator pad, such as hemp, polyester, polypropylene, or polyethylene, but preferably are formed of polypropylene. Most preferably, the stiffening layers 14, 20 are polypropylene that has been formed into an openmesh netting. One suitable polypropylene netting is No. 6155 from Maynard Plastics of Salem, Mass., a division of Applied Extrusion Technologies, Inc. No. 6155 is a polypropylene netting with 6.4 pounds of material per 1000 square feet and has a weave grid with ¼ inch squares.

The stiffening layers 14, 20 may be attached to the core foam center sheet 16 with an adhesive, such as a contact adhesive that contains about 18% vinyl acetate. Once the adhesive has been applied to the surfaces of the foam center sheet 16, the stiffening layers 14, 20 are positioned adjacent to the adhesive-coated surfaces on the foam sheet 16 and the layers 14, 20 and sheet 16 are together passed between compression rollers. The adhesive hardens to securely and immovably affix the stiffening layers 14, 20 to the core foam sheet 16.

The stiffening layers 14, 20 might also be attached to the core foam center sheet 16 by flame laminating (i.e., by heating either the top or bottom, or both, surfaces of the foam center sheet to depolymerize and soften the surface 16 and then contacting the tacky softened surface(s) with the material to be laminated while pressure is applied). After the laminate is allowed to cool, the stiffening layers 14, 20 are securely and immovably affixed to the core foam center sheet 16.

Preferably, the stiffening layers 14, 20 are attached to the foam center sheet 16 with a hot melt film adhesive, such as a polyethylene polyacrylic acid copolymer. Once that adhesive cures, the stiffening layers 14, 20 are securely and immovably affixed to the core foam center sheet 16.

After the stiffening layers 14, 20 are applied to the foam center sheet 16, the layered material so formed may be cut to any desired shape and installed between the springs and cushions of an article of furniture, such as a chair. The insulator pad 10 may also be installed between the springs and cushioning material of a mattress. The insulator pad 10 of the invention may also be installed in motor vehicle seats, such as between the support springs and seat cushions installed in automobiles, trucks and vans.

Referring now to FIGS. 3–5, in a preferred embodiment of the invention, the insulator pad 10A is formed from seven components and results in a pad with five layers. FIGS. 3 and 4 show the overlay of the five layers: a foam sheet 22, a stiffening layer 14, a core foam center sheet 16, a stiffening layer and another foam sheet 22. The other two "components" are the adhesive applied to the upper and lower surface of the core foam center sheet, although it is noted that certain methods for applying the layers, such as flame lamination, eliminate the need for separate adhesive. As in the other embodiment shown in FIGS. 1 and 2, the core foam center sheet 16 is sandwiched between two stiffening layers 14, 20. In addition, the pad 10A is provided with foam sheets 22 that are laid adjacent the stiffening layers 14, 20 and form the outer layers of the pad. The foam sheets 22 preferably are formed from polyurethane foam, most preferably polyether polyurethane foam. The sheets 22 preferably are thinner than the core foam and have a thickness of about ¹⁄₃₂ inches.

FIG. 5 illustrates the finished insulator pad 10A as assembled. The foam sheets 22 and the stiffening layers 14, 20 are attached by adhesive to the surfaces of the core foam sheet 16.

Referring now to FIGS. 6–9, the insulator pad 10A is formed preferably by one of the following methods. According to the method shown in FIG. 6, a hot melt adhesive film 32 is positioned adjacent or applied to the top surface 12 of the core foam center sheet 16. Next, the stiffening layer 14 is positioned adjacent to the hot melt adhesive film 32, and a thin foam sheet 22 is positioned adjacent to the stiffening layer. A suitable hot melt film adhesive for this purpose is a polyethylene polyacrylic acid copolymer, such as Dow Chemical No. 916. The foam center sheet 16, adhesive 32, stiffening layer 14, and foam sheet 22 are then passed between compression rollers 34, 36, with the heated roller 34 closest to the foam sheet 22. The heat from the heated roller 34 activates the hot melt film adhesive 32, thus bonding together the stiffening layer 14 and foam center sheet 16. Preferably, the stiffening layer 14 will have holes or gaps through which portions of the adhesive 32 will be exposed. In such a case, portions of the surface of the foam sheets 22 will adhere to the exposed adhesive-coated portions of the surface of the core foam center sheet 16, forming the layered insulator pad 10. The foam sheet 22 prevents the heated compression roller 34 from contacting the stiffening layer 14 and any exposed adhesive 32. The foam sheet 22 thus prevents damage to the roller 34 from the build up of excess adhesive.

Figure 6:
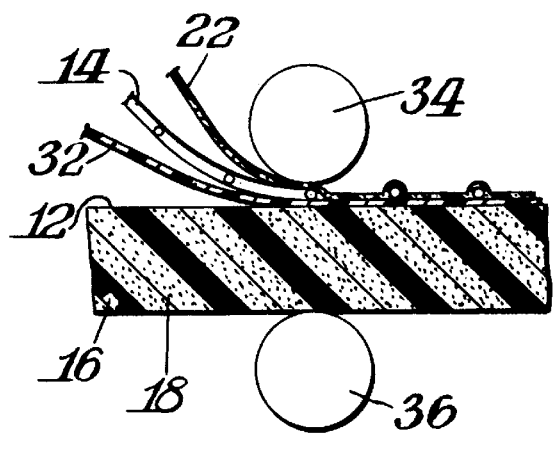
FIG. 6 is a diagrammatic view in side elevation of a first method for manufacturing a laminated product, such as an insulator pad.
Figure 7:
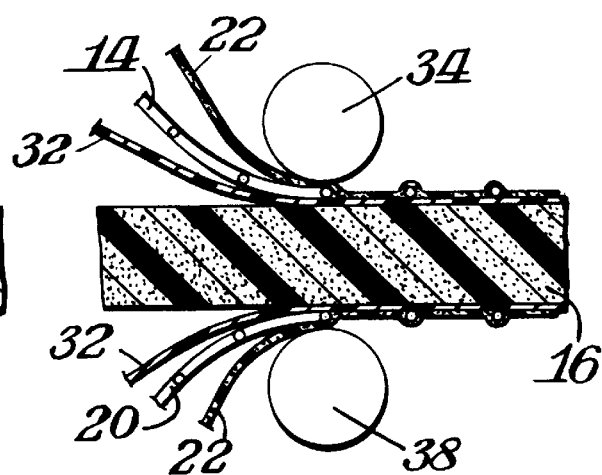
FIG. 7 is a diagrammatic view in side elevation of a second method for manufacturing a laminated product such as an insulator pad.

Layered insulator pad 10A with stiffening layers and foam protective sheets attached to both the top and bottom surfaces of the foam center sheet 16 may be formed with the apparatus shown in FIG. 6 if additional adhesive, an additional stiffening layer and an additional foam protective sheet are placed adjacent the other or bottom surface 18 of the foam center sheet 16 and the material is inverted and passed again through the compression rollers 34, 36. Alternatively, the layered insulator pad 10A may be formed with only a single pass between compression rollers if the compression rollers are both heated as shown in FIG. 7. In such embodiment, a layer of hot melt film adhesive 32 is placed adjacent both the top and bottom surfaces of the core foam center sheet 16, stiffening layers 14, 20 are placed adjacent such adhesive 32, and protective foam sheets 22 are placed adjacent the stiffening layers 14, 20. The core foam center sheet 16 with the other layers in the stated order is passed between two heated compression rollers 34, 38 to activate the adhesive and bond the stiffening layers 14, 20 to the core foam center sheet 16. Preferably, the foam sheets 22 will bond to the core foam center sheet 16 where the adhesive 32 penetrates through gaps or holes or pores in the stiffening layers 14, 20. Even if the foam sheets 22 do not adhere, they will still provide a protective barrier that prevents the build up of foam or adhesive on the compression rollers 34, 38.

Figure 8:
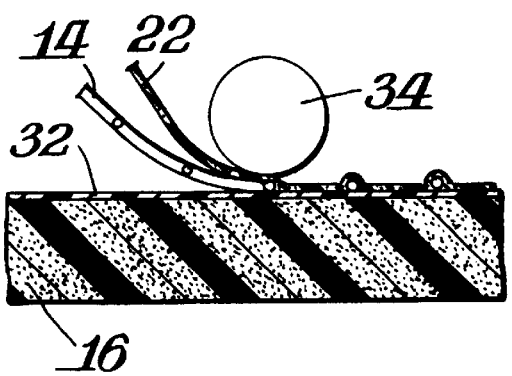
FIG. 8 is a diagrammatic view in side elevation of a third method for manufacturing a laminated product such as an insulator pad.

In an alternate method for attaching the stiffening layer 14 to the foam center sheet 16, as shown in FIG. 8, an adhesive may be applied to the top surface 12 of the foam center sheet 16. The adhesive may be a pressure sensitive contact adhesive, such as an acrylic adhesive UP304 offered by Coating Sciences, Inc. of Bloomfield, Conn., or a hot melt film adhesive. The adhesive-coated foam center sheet 16, stiffening layer 14 and thin foam sheet 22 are then passed on a conveyor under a compression roller 34. The compression roller 34 is heated where a hot melt film adhesive is used.

Figure 9:
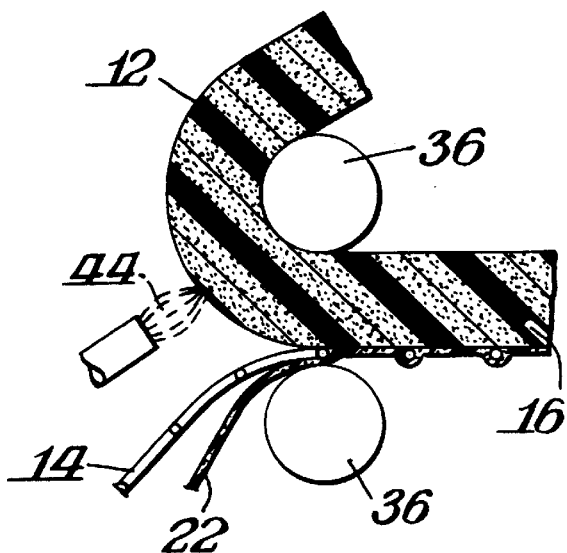
FIG. 9 is a diagrammatic view in side elevation of a fourth method for manufacturing a laminated product such as an insulator pad.

Flame lamination is a further alternate method for attaching the stiffening layer 14 to the core foam center sheet 16. As shown in FIG. 9, the top surface 12 of the foam center sheet 16 is heated by flame 44 or other heat source to depolymerize and soften the foam center sheet surface. The depolymerized foam surface is tacky or sticky. While the surface is in such tacky or sticky state, a stiffening layer 14 is placed adjacent to it, and the core foam center sheet 16 and stiffening layer 14 are forced between compression rollers 36. Preferably, a foam sheet 22 is placed adjacent to the stiffening layer 14 and provides a protective barrier between the surface of the compression roller 36 and the stiffening layer 14 and the tacky surface of the core foam center sheet 16.

EXAMPLE ACCORDING TO THE INVENTION

A suitable formulation to form the core foam center sheet 16 was produced by the following process. A polyol mixture was prepared from 35 parts of a polyether polyol (Voranol 3010-Dow) and 65 parts of a copolymer polyol (Voranol 3943-Dow). The polyol mixture (100 total parts) was reacted with 33.1 parts of TDI (toluene diisocyanate), 2.3 parts water, 0.12 parts tin catalyst (i.e., stannous octoate catalyst C-2 from Witco Corp.), 0.4 parts amine catalyst (C124—Niax A-1, a proprietary tertiary amine product of Air Products, in dipropylene glycol in a ratio of 1:6), and 0.8 parts of a silicone surfactant (L620 from Osi—a copolymer of polyether and polysiloxane). The isocyanate index was about 115 (i.e., a 15% excess of isocyanate over the stoichiometric amount).

All of the above ingredients were combined in a mixing chamber and agitated at high speed to form a reactive mixture. This reactive, foam-forming mixture was then discharged or dispensed from the mixing chamber onto a moving casting conveyor and allowed to rise and cure into the final foam product at ambient temperature and pressure. The resulting polyurethane foam had a density of about 2.5 lbs/ft$^3$ and an IFD$_{25}$ of about 70 to 120.

A suitable formulation to form the foam sheets 22 was produced by the following process. 100 parts of a polyether polyol (Voranol 3010-Dow) was reacted with 58.1 parts of TDI (toluene diisocyanate), 4.7 parts water, 1.0 part silicone surfactant (L6202 from Osi—a copolymer of polyether and polysiloxane), 1.2 parts tin catalyst (i.e., stannous octoate catalyst C-9 from Witco Corp.), 0.1 parts amine catalyst (C124—Niax A-1, a proprietary tertiary amine product of Air Products, in dipropylene glycol in a ratio of 1:6), and 1.0 part amine catalyst (NEM—N-ethylmorpholine). The isocyanate index was about 104 (i.e., a 4% excess of isocyanate over the stoichiometric amount). As with the core foam center sheet foam formulation, all of the above ingredients were combined in a mixing chamber and agitated at high speed to form a reactive mixture. This reactive, foam-forming mixture was then discharged or dispensed from the mixing chamber onto a moving casting conveyor and allowed to rise and cure into the final foam product at ambient temperature and pressure. The resulting polyurethane foam had a density of about 1.5 lbs/ft$^3$ and an IFD$_{25}$ of about 30–50, preferably about 40.

A hot roll laminator having a nip roll speed of 10 feet per minute was set to have a gap between the heated roll and the rubber compression roll of 0.2 inches. The hot roll had a surface temperature of 485° F. The material to be laminated together to form the insulator pad was passed between the rolls of the laminator. The material was layered in the following manner prior to reaching the roller: core foam center sheet of polyether polyurethane foam with a density of 2.5 lbs/ft$^3$, an IFD$_{25}$ of 100 and a thickness of 0.437 inches, hot melt adhesive (Dow 916), a stiffening layer (openmesh netting Maynard 6155) and outer foam sheet layer formed of polyether polyurethane foam with a density of 1.5 lbs/ft$^3$, an IFD$_{25}$ of 40 and a thickness of 0.032 inches. The outer foam layer was closest to the surface of the hot roller. Once the layers were laminated to the top surface of the core foam center sheet, the sheet was turned over for a second pass through the laminator rollers to laminate a second stiffening layer and a second outer foam layer to the bottom surface of the foam center sheet.

Stiffness Tests

Flexural three-point bend tests were conducted with an Instron Corporation Series IX Automated Materials Testing System 1.09 apparatus. Samples cut to a width of 2 inches and a span of four inches were laid across separated support members to form a bridge. A continually increasing force was applied to the center of the sample until the sample began to bend. The maximum applied force prior to bending is the flexural strength. The modulus, a stiffness measurement, is calculated as the slope of the stress versus strain curve before the maximum force is applied.

Four types of mattress and furniture insulator pads were tested: (a) prime foam core with stiffening layers and outer foam sheets according to the above example; (b) rebond foam core with stiffening layers and outer foam sheets of the same type as used for the sample (a) with the prime foam core; (c) GSI 3500 fiber pad; (d) GSI 1800 fiber pad. The results of the flexural three-point bend tests are set out in Table 1 below.

As shown by the results in Table 1, the modulus (psi) and flexural strength for the stiffening layer-reinforced prime and rebond insulator pads according to the invention are substantially higher than the modulus and flexural strength for the commercially available fiber insulator pads.

TABLE 1

| Pad Type | Specimen | Flex Strength (psi) | Displacement (in) | Modulus (psi) |
| --- | --- | --- | --- | --- |
| PRIME | 1 | 11.68 | .295 | 394.5 |
|  | 2 | 11.89 | .289 | 385.7 |
|  | 3 | 11.06 | .293 | 370.6 |
|  | 4 | 8.91 | .258 | 388.5 |
|  | 5 | 9.80 | .281 | 363.0 |
| Average |  | 10.67 | .283 | 380.4 |
| REBOND | 1 | 10.55 | .507 | 199.6 |
|  | 2 | 9.76 | .505 | 216.6 |
|  | 3 | 11.35 | .491 | 218.6 |
|  | 4 | 8.14 | .507 | 204.6 |
|  | 5 | 8.86 | .509 | 210.5 |
| Average |  | 9.73 | .504 | 209.9 |
| 3500 FIBER | 1 | 4.91 | .503 | 62.4 |
|  | 2 | 6.61 | .506 | 83.4 |
|  | 3 | 5.69 | .509 | 70.4 |
|  | 4 | 5.23 | .506 | 76.3 |
|  | 5 | 5.41 | .492 | 77.6 |

TABLE 1-continued

| Pad Type | Specimen | Flex Strength (psi) | Displacement (in) | Modulus (psi) |
| --- | --- | --- | --- | --- |
| Average | | 5.57 | .503 | 74.0 |
| 1800 FIBER | 1 | 2.25 | .497 | 37.8 |
| | 2 | 2.35 | .488 | 34.4 |
| | 3 | 2.12 | .498 | 36.7 |
| | 4 | 2.51 | .502 | 36.7 |
| | 5 | 2.24 | .500 | 30.2 |
| Average | | 2.29 | .497 | 34.4 |

While the invention has been particularly shown and described with reference to preferred embodiments thereof, it will be understood by those skilled in the art that various changes in form and details may be made without departing from the spirit and scope of the invention as defined in the appended claims.

I claim:

1. A dimensionally stable mattress and furniture insulator pad, comprising:
    a core foam sheet formed from rebonded polyurethane foam having an upper surface and a lower surface;
    a first stiffening layer having an upper face and a lower face, wherein the lower face is attached to the upper surface of the core foam sheet;
    a second stiffening layer having an upper face and a lower face wherein the upper face is attached to the lower surface of the core foam sheet;
    a first outer polyurethane foam sheet attached adjacent to the top face of the first stiffening layer so that the first stiffening layer is substantially completely covered by the outer foam sheet; and
    a second outer polyurethane foam sheet attached adjacent to the bottom face of the second stiffening layer so that the second stiffening layer is substantially completely covered by the outer foam sheet;
so that the core foam sheet with first and second stiffening layers and first and second outer foam sheets attached thereto forms the dimensionally stable mattress and furniture insulator pad with a sufficient stiffness to resist bending and telegraphing.

2. An article of furniture, comprising:
    a dimensionally stable mattress and furniture insulator pad in combination with furniture springs and a furniture cushion, with said mattress and furniture insulator pad, comprising:
        a polyurethane core foam sheet having an upper surface and a lower surface;
        a first stiffening layer having an upper face and a lower face, wherein the lower face is attached to the upper surface of the core foam sheet;
        a second stiffening layer having an upper face and a lower face wherein the upper face is attached to the lower surface of the core foam sheet;
        a first outer polyurethane foam sheet attached adjacent to the top face of the first stiffening layer so that the first stiffening layer is substantially completely covered by the outer foam sheet; and
        a second outer polyurethane foam sheet attached adjacent to the bottom face of the second stiffening layer so that the second stiffening layer is substantially completely covered by the outer foam sheet;
so that the core foam sheet with first and second stiffening layers and first and second outer foam sheets attached thereto forms the dimensionally stable mattress and furniture insulator pad with a sufficient stiffness to resist bending and telegraphing.

3. The article of furniture of claim 2, wherein the article of furniture is a motor vehicle seat.

4. A mattress, comprising:
    a combination of springs and a cushioning material; and
    a dimensionally stable mattress and furniture insulator pad positioned between the springs and the cushioning material, with said mattress and furniture insulator pad, comprising:
        a polyurethane core foam sheet having an upper surface and a lower surface;
        a first stiffening layer having an upper face and a lower face, wherein the lower face is attached to the upper surface of the core foam sheet;
        a second stiffening layer having an upper face and a lower face wherein the upper face is attached to the lower surface of the core foam sheet;
        a first outer polyurethane foam sheet attached adjacent to the top face of the first stiffening layer so that the first stiffening layer is substantially completely covered by the outer foam sheet; and
        a second outer polyurethane foam sheet attached adjacent to the bottom face of the second stiffening layer so that the second stiffening layer is substantially completely covered by the outer foam sheet;
so that the core foam sheet with first and second stiffening layers and first and second outer foam sheets attached thereto forms the dimensionally stable mattress and furniture insulator pad with a sufficient stiffness to resist bending and telegraphing.

* * * * *